United States Patent
Saito et al.

(10) Patent No.: US 7,806,971 B2
(45) Date of Patent: Oct. 5, 2010

(54) YELLOW INK COMPOSITION, INK SET, INK JET RECORDING METHOD USING INK SET, AND RECORD

(75) Inventors: Chie Saito, Matsumoto (JP); Miharu Kanaya, Azumino (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/321,050

(22) Filed: Jan. 15, 2009

(65) Prior Publication Data

US 2009/0181219 A1 Jul. 16, 2009

(30) Foreign Application Priority Data

Jan. 15, 2008 (JP) ............... 2008-005427

(51) Int. Cl.
*C09D 11/02* (2006.01)
*B41J 2/01* (2006.01)

(52) U.S. Cl. ............... 106/31.6; 106/31.86; 106/31.75; 347/100

(58) Field of Classification Search ............... 106/31.6, 106/31.86, 31.75; 347/100
See application file for complete search history.

(56) References Cited

U.S. PATENT DOCUMENTS

| | | | | |
|---|---|---|---|---|
| 6,043,297 | A * | 3/2000 | Sano | 523/160 |
| 6,110,267 | A * | 8/2000 | Winter et al. | 106/31.77 |
| 6,284,029 | B1 * | 9/2001 | Sano et al. | 106/31.6 |
| 6,562,117 | B2 * | 5/2003 | Sano et al. | 106/31.6 |
| 6,821,330 | B1 * | 11/2004 | Sano et al. | 106/31.86 |
| 6,869,470 | B2 * | 3/2005 | Kato | 106/31.6 |
| 6,924,327 | B2 * | 8/2005 | Sano et al. | 523/160 |
| 7,670,418 | B2 * | 3/2010 | Kato et al. | 106/31.6 |
| 2002/0007765 | A1 * | 1/2002 | Sano et al. | 106/31.86 |
| 2002/0077384 | A1 * | 6/2002 | Sano et al. | 523/160 |
| 2008/0233362 | A1 * | 9/2008 | Kato et al. | 106/31.6 |
| 2009/0196995 | A1 * | 8/2009 | Saito et al. | 427/256 |

FOREIGN PATENT DOCUMENTS

JP 10-120956 5/1998
JP 2000-345080 12/2000

* cited by examiner

*Primary Examiner*—Helene Klemanski
(74) *Attorney, Agent, or Firm*—Nutter McClennen & Fish LLP; John J. Penny, Jr.

(57) ABSTRACT

A yellow ink composition comprises C. I. Pigment Yellow 185 used as a colorant and has a pigment concentration of 10 to 20 weight percent.

12 Claims, 4 Drawing Sheets

YELLOW INK COMPOSITION, INK SET, INK JET RECORDING METHOD USING INK SET, AND RECORD

BACKGROUND

1. Technical Field

The present invention relates to a yellow ink composition used in ink jet recording methods; an ink set comprising the yellow ink composition, a cyan ink composition, and a magenta ink composition; an ink jet recording method used to make a print by applying a reaction solution and an ink composition to a recording medium; and a record made by the ink jet recording method.

2. Related Art

Ink jet recording methods are printing methods used to make prints by applying fine droplets of ink compositions to recording media such as paper sheets. The ink jet recording methods are characterized in that high-resolution, high-quality images can be quickly printed with relatively inexpensive devices.

An ink composition used for ink jet recording usually comprises water, which is a principal component; a coloring component; and a humectant, such as glycerin, for preventing clogging. Examples of the coloring component include various types of water-soluble dyes, which are widely used because colorants available for the water-soluble dyes are high in chroma, rich in type, and water-soluble.

However, some of dyes have undesirable properties, for example, low light resistance and water resistance; hence, prints made using ink compositions comprising such dyes have low light resistance and water resistance. Although ink jet paper sheets including ink-absorbing layers are improved in water resistance, plain paper sheets are insufficient in water resistance.

Pigments are superior in light resistance and water resistance to the dyes. In recent years, it has been studied that the pigments are used as coloring agents for ink compositions for ink jet recording for the purpose of improvement in light resistance and water resistance. The pigments are usually insoluble in water. Therefore, in the case where the pigments are used for aqueous ink compositions, stable aqueous dispersions prepared by dispersing the pigments in water need to be used to prepare the aqueous ink compositions. For example, the following inks have been proposed: an aqueous pigment ink prepared by dispersing a pigment in water with a surfactant or a polymeric dispersant, an aqueous pigment ink comprising a self-dispersing pigment having a water-soluble functional group, and an aqueous pigment ink comprising fine colored particles comprising a pigment coated with a water-soluble resin.

In view of the use of the pigments as coloring agents for ink jet recording inks, the pigments are superior in light resistance and water resistance to the dyes; however, the number of types of colorants available for the pigments is less than the number of types of colorants available for the dyes. Before a pigment is actually used to prepare an ink jet recording ink, the pigment needs to be evaluated for hue in addition to light resistance and water resistance. For example, JP-A-2000-345080 discloses a yellow ink composition comprising a specific pigment having high light resistance and two specific pigments having excellent color developability. Furthermore, JP-A-10-120956 discloses that the use of an ink set comprising a cyan ink composition, a magenta ink composition, and a yellow ink composition is effective in printing an image having a good hue, high light resistance, and high water resistance.

The inventors have found that an ink set comprising a yellow ink composition, magenta ink composition, and cyan ink composition each comprising a specific pigment is useful in printing an image having a good hue and high light resistance by a color ink jet recording method and is effective in obtaining a record having a good balance between sharpness and thickness by one-path quick printing. The present invention is based on this finding.

SUMMARY

An advantage of an aspect of the present invention is to provide an ink composition which is useful in printing an image having a good hue and high light resistance and useful in obtaining a record having a good balance between sharpness and thickness by one-path quick printing and which has good storage stability. An advantage of another aspect of present invention is to provide an ink set for ink jet recording.

A yellow ink composition according to the present invention comprises C. I. Pigment Yellow 185 used as a colorant and has a pigment concentration of 10 to 20 weight percent.

An ink set for ink jet recording according to the present invention comprises a cyan ink composition, a magenta ink composition, and a yellow ink composition. The cyan ink composition comprises at least one of C. I. Pigment Blue 15:3 and C. I. Pigment Blue 15:4 used as colorants. The magenta ink composition comprises at least one selected from the group consisting of C. I. Pigment Red 122, C. I. Pigment Red 202, C. I. Pigment Red 209, and C. I. Pigment Violet 19 used as colorants. The yellow ink composition comprises C. I. Pigment Yellow 185 used as a colorant. The cyan, magenta, and yellow ink compositions have a pigment concentration of 10 to 20 weight percent.

An ink jet recording method according to the present invention includes ejecting droplets of at least one of the cyan, magenta, and yellow ink compositions comprised in the ink composition according to any one of claims 6 to 10 and also includes applying the droplets to a recording medium to print a character on the recording medium.

The present invention provides an ink composition which is useful in printing an image having a good hue and high light resistance and useful in obtaining a record having a good balance between sharpness and thickness by one-path quick printing and which has good storage stability. The present invention provides an ink set, comprising the ink composition, for ink jet recording.

BRIEF DESCRIPTION OF THE DRAWINGS

The present invention will be described with reference to the accompanying drawings, wherein like numbers reference like elements.

DESCRIPTION OF EXEMPLARY EMBODIMENTS

Figure 1:
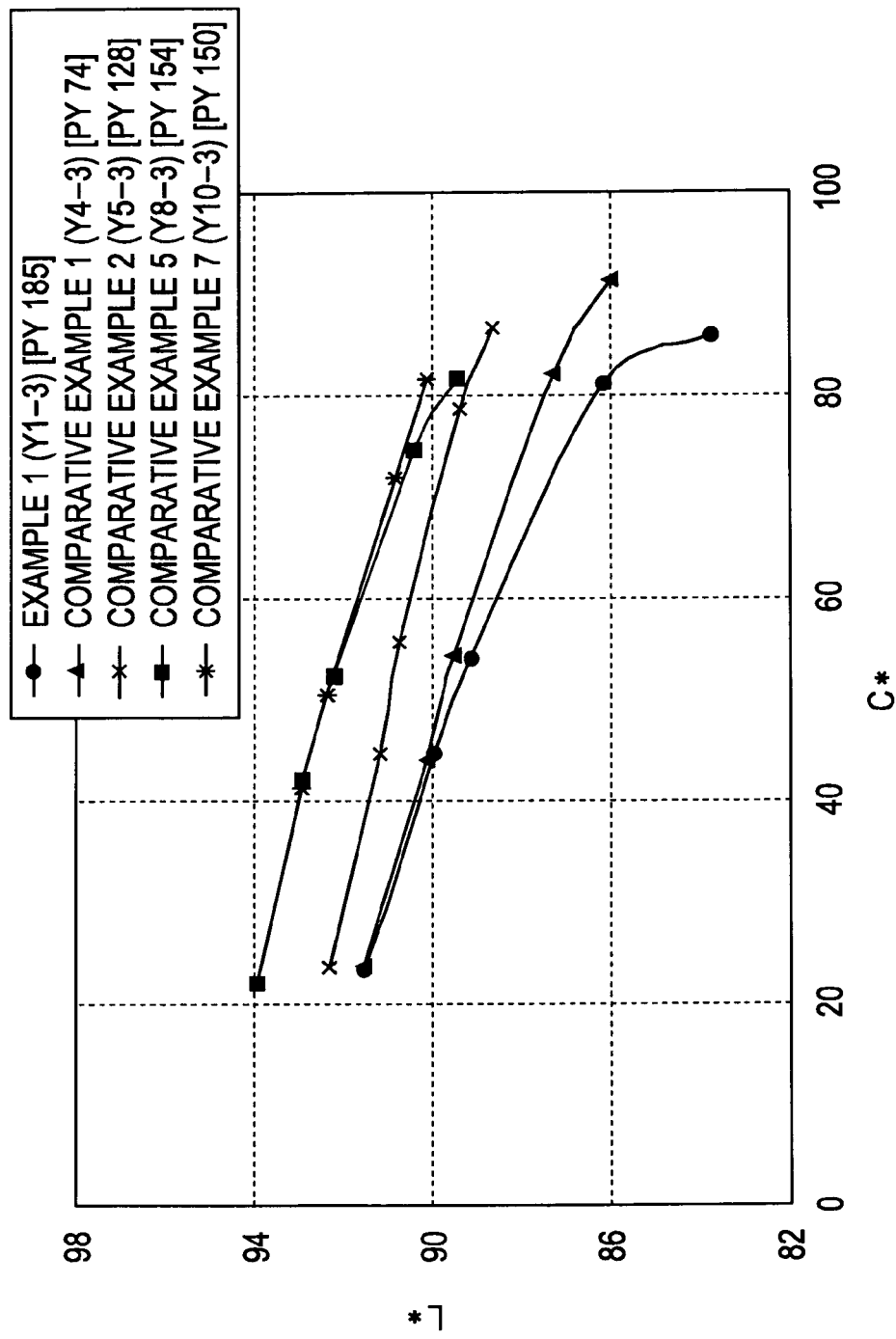
FIG. 1 is a graph showing the relationship between the lightness (L*) and chroma (C*) determined by fixing the concentration of a pigment.

A yellow ink composition according to the present invention comprises C. I. Pigment Yellow 185 used as a colorant and has a pigment concentration of 10 to 20 weight percent.

An ink set according to the present invention comprises the yellow ink composition, a cyan ink composition, and a magenta ink composition. The cyan and magenta ink compositions each comprise a specific pigment used as a colorant. The yellow, cyan, and magenta ink compositions will now be described.

Yellow Ink Composition

The yellow ink composition comprises C. I. Pigment Yellow 185 and has a pigment concentration of 10 to 20 weight percent as described above. Therefore, the yellow ink composition is useful in printing an image having a good hue and high light resistance and useful in obtaining a record having a good balance between sharpness and thickness by one-path quick printing. The term "one-path quick printing" as used herein means a recording process in which the number of scanning operations needed to record one dot line is one, that is, one dot line is recorded as one path and which is useful in performing quick printing. Examples of an ink jet printer for performing the recording process include a serial ink jet printer which includes a recording head, a head-scanning mechanism for moving the recording head in a main scanning direction, and a sheet-feeding mechanism for performing an auxiliary operation by feeding a recording medium such as a recording sheet in a sheet-feeding direction and which stores data on the recording medium by repeating the main operation of the recording head and the auxiliary operation of sheet feeding and also include a line head-type ink jet printer including an elongate recording head which has a length equal to the width of a recording medium such that recording can be performed without moving the elongate recording head.

The yellow ink composition, which comprises the yellow pigment, is used in combination with the magenta and cyan ink compositions and the yellow, magenta, and cyan ink compositions each have a pigment concentration of 10 to 20 weight percent. This is effective in printing an image having a good hue and high light resistance and effective in obtaining a record having a good balance between sharpness and thickness by one-path quick printing.

The yellow ink composition, which is suitable for ink jet recording, may be a self-dispersing pigment ink comprising water and a pigment that is dispersible in water in the absence of any dispersant or may be a pigment ink comprising a water-soluble pigment coated with resin.

A self-dispersing pigment ink preferably used herein comprises a pigment that is dispersible or soluble in an aqueous medium in the absence of any dispersant. The pigment carries a large number of hydrophilic functional groups directly or indirectly attached to the surface of the pigment with polyvalent groups disposed therebetween and/or carries salts of the hydrophilic functional groups. The pigment can be obtained in such a manner that functional groups or molecules comprising functional groups are grafted onto the surface of a pigment material by physical treatment such as vacuum plasma treatment or chemical treatment using an oxidant such as sodium hypochlorite or ozone. The functional groups grafted on each particle of the pigment material may be the same or different from each other. The type and degree of the grafted functional groups may be determined in consideration of the dispersion stability and color density of the ink, the dryness of the ink placed on the front surface of an ink jet head, and/or the like.

The pigment, which is used herein, can be produced by a method disclosed in, for example, JP-A-8-3498.

The pigment may be a commercially available one. A preferred example of the pigment is Microjet CW-1 which is available from Orient Chemical Industries, Ltd. and which is a black pigment made from carbon black.

A preferred procedure for dispersing a colorant used herein in water using a dispersing resin is as follows: a polymer comprising an anionic group is dissolved or dispersed in an alkaline aqueous solution comprising an alkaline compound such as an organic amine or an alkali metal salt and the colorant is then mixed with the resulting solution using a disperser such as a ball mill, a sand mill, an attritor, a roll mill, an agitator mill, a Henschel mixer, a colloid mill, an ultrasonic homogenizer, a jet mill, or an angmill. In order to tightly bonding the dispersing resin to the colorant to stably disperse the colorant, a dispersion may be produced by a process disclosed in JP-A-9-151342, JP-A-10-140065, JP-A-11-209672, JP-A-11-172180, JP-A-10-25440, JP-A-11-43636, or JP-A-2001-247810. The process is described below.

JP-A-2001-247810, JP-A-9-151342, and JP-A-10-140065 disclose a phase inversion process and an acid precipitation process.

The term "phase inversion process" as used herein means a technique for dispersing a molten mixture of a pigment and a polymer having self-dispersibility or solubility and is referred to as a self-dispersion (phase-inversion emulsification) process. The term "molten mixture" as used herein means a mixture which is in such a state that the pigment and the polymer are not melted and are mixed with each other, such a state that the pigment and the polymer are melted and mixed with each other, or such an intermediate between these states. An example of the phase inversion process is a process for producing a pigment-comprising polymeric particulate colorant dispersion comprising a pigment coated with a water-soluble polymer. This process includes (1) a step of preparing a solvent-based slurry by adding the pigment, a neutralizer, and a small amount of water to a solution of a dispersing resin precursor (for example, the anionic group-comprising polymer) in a solvent, (2) a step of preparing a water-based slurry by adding the solvent-based slurry to a large amount of water, and (3) a step of removing the solvent from the water-based slurry.

The term "acid precipitation process" as used herein means a technique that is used to produce a colorant in such a manner that a water-containing cake comprising a polymer and a pigment is prepared and some of unneutralized groups comprised in the polymer are neutralized with a neutralizer. When the unneutralized groups are anionic acid groups and the neutralizer is an basic compound, the acid precipitation process includes (1) a step of gelling the polymer in such a manner that the polymer and the pigment are dispersed in an alkaline aqueous medium and the dispersion is heated as required, (2) a step of fixing the polymer to the pigment in such a manner that the polymer is rendered hydrophobic by neutralizing or acidifying the dispersion, (3) a step of preparing a water-containing cake in such a manner that the dispersion is filtered and the cake obtained thereby is water-washed as required, (4) a step of re-dispersing the polymer in an aqueous medium in such a manner that anionic groups comprised in the polymer are neutralized in part or in entirety with a basic compound, and (5) a step of gelling the polymer in such a manner that this dispersion is heated as required.

Examples of the phase inversion process and the acid precipitation process may be substantially the same as processes disclosed in JP-A-9-151342 or JP-A-10-140065.

JP-A-11-209672 and JP-A-11-172180 each disclose a process for producing a colorant. This process principally includes (1) a step of mixing a polymer comprising anionic groups or a solution of the polymer in an organic solvent with a basic compound such that the polymer is neutralized, (2) a step of preparing a pigment dispersion in such a manner that an emulsion is prepared by adding a pigment to the mixture and the pigment is dispersed in the emulsion with a disperser, (3) a step of removing the solvent from the pigment dispersion by distillation as required, (4) a step of coating the pigment with the polymer in such a manner that an acidic compound is added to the pigment dispersion such that the polymer is precipitated, (5) a step of filtering and water-washing the pigment dispersion as required, and (6) a step of preparing an aqueous colorant dispersion in such a manner that the anionic groups of the polymer are neutralized with a basic compound and the polymer is then dispersed in an aqueous medium.

When the colorant used herein is a pigment, ink may comprise a resin emulsion. The presence of the resin emulsion allows a print to be improved in fixability and wear resistance. The continuous phase of the resin emulsion is preferably water and the disperse phase thereof is preferably an acrylic resin, a methacrylic resin, a styrene resin, a urethane resin, an acrylamide resin, an epoxy resin, or a mixture of some of these resins. In particular, the disperse phase thereof is preferably a resin produced primarily from acrylic acid and/or methacrylic acid. These resins may be, but are not limited to, copolymers such as block copolymers and random copolymers. The resin emulsion preferably has an ability to form a film and a minimum film-forming temperature lower than or equal to room temperature.

The yellow ink composition preferably further comprises water, a water-soluble organic compound, a pH adjuster, and a nonionic surfactant.

The water comprised in the yellow ink composition is a principal solvent. Preferred examples of the water therein include pure water such as ion-exchanged water, ultrafiltered water, reverse osmosis-purified water, or distillated water and ultra-pure water.

Examples of the water-soluble organic compound include polyols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, 1,5-pentanediol, and 4-methyl-1,2-pentanediol; sugars such as glucose, mannose, fructose, ribose, xylose, arabinose, galactose, aldonic acid, glucitol, sorbit, maltose, cellobiose, lactose, sucrose, trehalulose, and maltotriose; sugar alcohols; hyaluronic acid; so-called solid humectants such as trimethylolethane, trimethylolpropane, urea, and urea derivatives including dimethylurea; alkyl alcohols, such as methanol, ethanol, propanol, and butanol, having one to four carbon atoms; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monobutyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; pyrrolidones such as 2-pyrrolidone and N-methyl-2-pyrrolidone; 1,3-dimethyl-2-imidazolidinone; amides such as formamide and acetamide; dimethyl sulfoxide; sorbitan; acetins such as monoacetin, diacetin, and triacetin; and sulfolanes. These compounds may be used alone or in combination. The content of the water-soluble organic compound in the yellow ink composition is preferably 10 to 50 weight percent in view of properties (for example, viscosity) of the yellow ink composition and the quality and reliability of prints.

The yellow ink composition may further comprise a water-soluble organic solvent comprising polyols, a solid humectant, and a glycol butyl ether. This allows the yellow ink composition to be excellent in print quality, ejection stability, and reliability such as clogging recovery. This is because the polyols and the solid humectant have high water retentivity (moisture retentivity) and are effective in controlling the permeability of the yellow ink composition into recording media such as sheets of plain paper and the glycol butyl ether is effective in controlling the ejection stability the yellow ink composition and the permeability of the yellow ink composition into such recording media. The use of the polyols, the solid humectant, and the glycol butyl ether in combination allows the yellow ink composition to have high print quality, ejection stability, and reliability such as clogging recovery.

In particular, the polyols are preferably at least two selected from the group consisting of glycerin, diethylene glycol, triethylene glycol, 1,5-pentanediol, and 1,2-hexanediol; the solid humectant is preferably trimethylol ethane, trimethylol propane, or urea; and the glycol butyl ether is preferably diethylene glycol monobutyl ether or triethylene glycol monobutyl ether.

The yellow ink composition preferably comprises the pH adjuster as described above. Examples of the pH adjuster include alkali hydroxides such as lithium hydroxide, potassium hydroxide, and sodium hydroxide; ammonia; and alkanolamines such as triethanolamine, tripropanolamine, diethanolamine, and monoethanolamine. In particular, the pH adjuster is preferably at least one selected from the group consisting of hydroxides of alkali metals, ammonia, triethanolamine, and tripropanolamine. The yellow ink composition preferably has a pH of 6 to 10. When the pH of the yellow ink composition is outside the range of 6 to 10, the yellow ink composition adversely affects materials comprised in ink jet printers and is deteriorated in clogging recovery.

The yellow ink composition may further comprise a pH buffer such as collidine, imidazole, phosphoric acid, 3-(N-morpholino) propanesulfonic acid, tris(hydroxymethyl)aminomethane, or boric oxide as required.

The yellow ink composition may comprise a trialkanolamine. The trialkanolamine functions as a gloss agent to form a uniform glossy image on a glossy recording medium.

When the yellow ink composition comprises the trialkanolamine, the content of the trialkanolamine in the yellow ink composition is preferably one weight percent or more and more preferably one to three weight percent and the amount of the trialkanolamine is preferably 10 to 50 weight percent of that of the pigment and more preferably 12 to 45 weight percent in view of the corrosion of members used in printers and the viscosity and gloss of ink.

The trialkanolamine is preferably, but is not limited to, triethanolamine or tripropanolamine in view of the stability and gloss of prints.

The yellow ink composition may further comprise a surfactant, an antifoaming agent, an antioxidant, an ultraviolet absorber, an antiseptic, and an anti-mildew agent.

Examples of the surfactant include anionic surfactants, cationic surfactants, amphoteric surfactants, and nonionic surfactants. In order to allow the yellow ink composition to be foamless, the surfactant is preferably a nonionic one.

Examples of the nonionic surfactants include acetylene glycol surfactants; acetylene alcohol surfactants; ethers such as polyoxyethylene nonylphenyl ethers, polyoxyethylene octylphenyl ethers, polyoxyethylene dodecylphenyl ethers, polyoxyethylene alkylallyl ethers, polyoxyethylene oleyl ethers, polyoxyethylene lauryl ethers, polyoxyethylene alkyl ethers, and polyoxyalkylene alkyl ethers; polyoxyethyleneoleic acids; esters such as polyoxyethylene oleates, polyoxyethylene distearates, sorbitan laurate, sorbitan monostearate, sorbitan monooleate, sorbitan sesquioleate, polyoxyethylene monooleates, and polyoxyethylene stearates; polyether-modified siloxane surfactants such as dimethyl polysiloxanes; and fluorine-comprising surfactants such as fluoroalkyl esters and perfluoroalkyl carboxylates. The nonionic surfactants [may be used alone or in combination.

Among the nonionic surfactants, preferred are the acetylene glycol surfactants and the polyether-modified siloxane surfactants because the acetylene glycol surfactants and the polyether-modified siloxane surfactants are foamless and have excellent antifoaming performance.

Examples of the acetylene glycol surfactants include 2,4,7,9-tetramethyl-5-decyne-4,7-diol, 3,6-dimethyl-4-octyne-3,6-diol, 3,5-dimethyl-1-hexyne-3-ol, and commercially available surfactants such as Surfynols 104, 82, 465, 485, and TG available from Air Products and Chemicals, Inc., and other surfactants such as Olfines STG and E1010 available from Nissin Chemical Industry Co., Ltd. Examples of the polyether-modified siloxane surfactants include BYK-345, BYK-346, BYK-347, BYK-348, and UV3530 available from Byk Chemie Japan K.K. The yellow ink composition may comprise some of these surfactants. The yellow ink composition preferably has a surface tension of 20 to 40 mN/m and a surfactant content of 0.1 to 3.0 weight percent.

Examples of the antioxidant or the ultraviolet absorber include allophanates such as methyl allophanate; biurets such as dimethyl biuret and tetramethyl biuret; L-ascorbic acid; L-ascorbates; products, such as Tinuvin 328, Tinuvin 900, Tinuvin 1130, Tinuvin 384, Tinuvin 292, Tinuvin 123, Tinuvin 144, Tinuvin 622, Tinuvin 770, Tinuvin 292, Irgacor 252, Irgacor 153, Irganox 1010, Irganox 1076, Irganox 1035, and Irganox MD1024, available from Ciba Geigy Corporation; and lanthanide oxides.

Examples of the antiseptic or the anti-mildew agent include sodium benzoate; sodium pentachlorophenolate; 2-pyridinethiol-1-oxide sodium; sodium sorbate; sodium dehydroacetate; 1,2-dibenzylthiazoline-3-on; and products, such as Proxel CRL, Proxel BDN, Proxel GXL, Proxel XL-2, and Proxel TN, available from Avecia Inc.

Magenta Ink Composition

The magenta ink composition, which is comprised in the ink set according to the present invention, comprises at least one selected from the group consisting of C. I. Pigment Red 122, C. I. Pigment Red 202, C. I. Pigment Red 209, and C. I. Pigment Violet 19 used as colorants. The magenta ink composition is used in combination with the yellow ink composition and the cyan ink composition, which is described below, and the magenta, yellow, and cyan ink compositions each have a pigment concentration of 10 to 20 weight percent. This is effective in printing an image having high light resistance and a good hue and effective in obtaining a record having a good balance between sharpness and thickness by one-path quick printing.

The magenta ink composition, as well as the yellow ink composition, may be a self-dispersing pigment ink comprising water and a pigment that can be dissolved in water without using any dispersant or may be a pigment ink comprising a water-soluble pigment coated with resin.

The magenta ink composition, as well as the yellow ink composition, preferably comprises water, a water-soluble organic compound, a pH adjuster, and a nonionic surfactant. The water, water-soluble organic compound, pH adjuster, and nonionic surfactant comprised in the magenta ink composition may be the same as those comprised in the yellow ink composition. The content of each of the water, water-soluble organic compound, pH adjuster, and nonionic surfactant in the magenta ink composition may be the same as that of each of those in the yellow ink composition.

Cyan Ink Composition

The cyan ink composition, which is comprised in the ink set according to the present invention, comprises at least one of C. I. Pigment Blue 15:3 and C. I. Pigment Blue 15:4 used as colorants. The cyan ink composition is used in combination with the yellow ink composition and the magenta ink composition and the cyan, yellow, and magenta ink compositions each have a pigment concentration of 10 to 20 weight percent. This is effective in printing an image having high light resistance and a good hue and effective in obtaining a record having a good balance between sharpness and thickness by one-path quick printing.

The cyan ink composition, as well as the yellow ink composition, may be a self-dispersing pigment ink comprising water and a pigment that can be dissolved in water without using any dispersant or may be a pigment ink comprising a water-soluble pigment coated with resin.

The cyan ink composition, as well as the yellow ink composition, preferably comprises water, a water-soluble organic compound, a pH adjuster, and a nonionic surfactant. The water, water-soluble organic compound, pH adjuster, and nonionic surfactant comprised in the cyan ink composition may be the same as those comprised in the yellow ink composition. The content of each of the water, water-soluble organic compound, pH adjuster, and nonionic surfactant in the cyan ink composition may be the same as that of each of those in the yellow ink composition.

Ink Set

The ink set according to the present invention comprises the yellow, magenta, and cyan ink compositions as described above.

The ink set may comprise an additional ink composition for color recording in addition to the yellow, magenta, and cyan ink compositions. The type and the like of the additional ink composition are not particularly limited as long as an advantage of the ink set is not deteriorated. The additional ink composition may be a common one for ink jet recording.

Examples of the additional ink composition include light cyan ink compositions, light magenta ink compositions, dark yellow ink compositions, red ink compositions, green ink compositions, blue ink compositions, orange ink compositions, and violet ink compositions. The light magenta ink compositions and the light cyan ink compositions have a colorant concentration less than that of the magenta ink composition and that of the cyan ink composition, respectively, and are used to obtain printed images improved in quality due to concentration modulation. The dark yellow ink compositions each comprise a colorant (pigment) less in lightness and/or chroma than that comprised in the yellow ink composition and are used to enhance the color reproducibility of dark portions such as shadow portions. The red, orange, green, blue, and violet ink compositions are used to achieve intermediate colors between yellow, magenta, and cyan to expand the range of color reproducibility.

The ink set can be configured in the same manner as that used to configure a conventional ink set and can be used as well as various conventional ink sets. In particular, the ink set can be used to quickly print a high-resolution, high-quality image with a relatively inexpensive device and therefore is suitable for ink jet recording applications, that is, such printing applications that fine droplets of ink are ejected and then applied to recording media such as paper sheets.

Ink Jet Recording Method

An ink jet recording method according to the present invention uses the ink set and includes ejecting droplets of ink compositions and applying the droplets to a heated recording medium to print a character on the recording medium. Examples of a technique for ejecting the droplets include a technique in which an electric signal is converted into a mechanical signal with a piezoelectric element and ink stored in a nozzle head portion is intermittently ejected such that a character or a symbol is recorded on a recording medium and a technique in which bubbles are generated by heating a position extremely close to a portion for ejecting ink stored in a nozzle head portion and the ink stored therein is intermittently ejected by the volume expansion of the bubbles such that a character or a symbol is recorded on a recording medium. The ink set is preferably used in an ink jet recording method using a piezoelectric element. The ink composition droplets are preferably ejected from a recording head for ejecting ink droplets by the mechanical action of a piezoelectric element.

Record

A record according to the present invention is made by recording data on a recording medium using the ink set and has a good image having high light resistance and a good balance between sharpness and thickness.

Examples of the recording medium include sheets of ink jet paper including matte paper, glossy paper, and the like; sheets of plain paper; sheets of printing paper; and films.

EXAMPLES

The present invention will now be further described in detail with reference to examples. The present invention is not limited to the examples.

Preparation of Self-Dispersing Yellow Pigment Dispersion

A 4-litter stainless steel beaker was attached to a rotor-stator mixer, L4RT-A, available from Silverson Machines, Inc. and then immersed in an ice bath. About 75 g of C. I. Pigment Yellow 185 and 1,000 g of water were placed into the beaker and then homogenized for 15 minutes at 7,200 rpm. To the homogenized mixture, 20 mL of an isopropanol solution comprising 2.07 g (0.01 mol) of o-acetanisidide was added. This mixture was stirred for 15 minutes.

A diazonium salt was produced in such a manner that 4.35 g (0.025 mol) of sulfanilic acid, 30 mL of 1N hydrochloric acid, and 1.73 g (0.025 mol) of sodium nitrite were mixed together in a vessel at a temperature of 5° C. to 10° C. The diazonium salt was mixed with the C. I. Pigment Yellow 185/o-acetanisidide mixture. This mixture was maintained at about 10° C. This mixture was adjusted to a pH of 5 to 6 with a 5M aqueous solution of sodium hydroxide and then stirred for two hours while the degree of the reaction of this mixture was checked by verifying the presence of the diazonium salt. The presence of the diazonium salt was verified in such a manner that a droplet of the reaction mixture and a droplet of a 1M $Na_2CO_3$ solution comprising 0.1% aminosalicylic acid were applied to a sheet of filter paper and it was checked whether the encounter between the two spots of the droplets became orange.

The reaction mixture was transferred to a Telsonic flow-through sonicator and then sonicated for two hours, whereby a yellow pigment dispersion was obtained. The yellow pigment dispersion was purified with a 50 nm-diameter filtration membrane column and then concentrated, whereby a self-dispersing yellow pigment dispersion with a solid content of 30% was obtained.

Self-dispersing pigment dispersions were prepared from C. I. Pigment Blue 15:3, C. I. Pigment Red 122, C. I. Pigment Yellow 74, C. I. Pigment Yellow 128, C. I. Pigment Yellow 110, C. I. Pigment Yellow 109, C. I. Pigment Yellow 154, and C. I. Pigment Yellow 138 in the same manner as above.

Preparation of Resin-Dispersing Yellow Pigment Dispersion

A colorant dispersion comprising a colorant comprising particles coated with a water-insoluble polymer was prepared by a procedure below. The volume-average size of the particles was determined with an analyzer, Microtrac UPA 150, available from Microtrac Inc. by particle size distribution.

Synthesis of Water-Insoluble Polymer

The following materials were placed into a reaction vessel filled with nitrogen and were then subjected to polymerization at 75° C. under stirring: 20 parts by weight of an organic solvent (methyl ethyl ketone), 0.03 parts by weight of a polymerization chain transfer agent (2-mercaptoethanol), a polymerization initiator, and a monomer mixture comprising 20% methacrylic acid, 45% styrene, 5% polyethylene glycol monomethacrylate (EO=15), 10% polyethylene glycol-polypropylene glycol monomethacrylate (EO=5 and PO=7), and 20% of a styrene macromonomer. The reaction mixture was mixed with 0.9 parts by weight of a solution prepared by dissolving 100 parts by weight of 2,2'-azobis (2,4-dimethylvaleronitrile) in 40 parts by weight of methyl ethyl ketone. This mixture was aged at 80° C. for one hour, whereby a water-insoluble polymer solution was obtained.

Preparation of Dispersion

The water-insoluble polymer was prepared by drying the obtained water-insoluble polymer solution. Five parts of the water-insoluble polymer was dissolved in 15 parts of methyl ethyl ketone. An aqueous solution of sodium hydroxide was added to this solution, whereby the water-insoluble polymer was neutralized. This solution and 15 parts of C. I. Pigment Yellow 185 were kneaded in a disperser while water was being poured into the disperser. To the kneaded mixture, 100 parts of ion-exchanged water was added. After the resulting mixture was stirred, methyl ethyl ketone and a portion of water were removed from the resulting mixture at 60° C. in a vacuum, whereby an aqueous yellow pigment dispersion with a solid concentration of 20 weight percent was obtained. The ratio of the pigment to water-insoluble polymer in the dispersion was 1:0.3. Particles of the pigment in the dispersion had a volume-average size of 110 nm.

Preparation of Ink Compositions

Components were mixed together as shown in Tables 1 to 5 and the mixtures were each filtered through a 10-μm membrane filter, whereby ink compositions were prepared. Numerical values in Table 1 to 5 each show the content of a corresponding one of the contents in the ink compositions on a weight percent basis.

TABLE 1

|  | Cyan ink compositions | | Magenta ink compositions | | Yellow ink compositions | | |
| --- | --- | --- | --- | --- | --- | --- | --- |
|  | C1-1 | C1-2 | M1-1 | M1-2 | Y1-1 | Y1-2 | Y1-3 |
| Pigment dispersion | Self-dispersion | Self-dispersion | Self-dispersion | Self-dispersion | Self-dispersion | Self-dispersion | Self-dispersion |
| Pigments | C.I. PB 15:3 | C.I. PB 15:3 | C.I. PR 122 | C.I. PR 122 | C.I. PY 185 | C.I. PY 185 | C.I. PY 185 |
|  | 5 | 15 | 5 | 15 | 5 | 10 | 15 |
| Glycerin | 15 | 10 | 15 | 10 | 15 | 12 | 10 |
| Triethylene glycol | 5 | 5 | 5 | 5 | 5 | 5 |  |
| 1,2-hexanediol | 2 | 2 | 2 | 2 | 2 | 2 | 2 |
| Trimethylol propane | 4 | 2 | 4 | 2 | 4 | 3 | 2 |
| Triethylene glycol monobutyl ether | 2 | 2 | 2 | 2 | 2 | 2 | 2 |
| Olfine E1010 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 |
| Triethanol amine | 1 | 1 | 1 | 1 | 1 | 1 | 1 |
| Ion-exchanged water | Remainder | Remainder | Remainder | Remainder | Remainder | Remainder | Remainder |

TABLE 2

|  | Yellow ink compositions | | | | | | |
| --- | --- | --- | --- | --- | --- | --- | --- |
|  | Y1-4 | Y1-5 | Y2 | Y3 | Y4-1 | Y4-2 | Y4-3 |
| Pigment dispersion | Self-dispersion | Self-dispersion | Resin dispersion | Self-dispersion | Self-dispersion | Self-dispersion | Self-dispersion |
| Pigments | C.I. PY 185 | C.I. PY 185 | C.I. PY 185 | C.I. PY 185 & C.I. PY 74 | C.I. PY 74 | C.I. PY 74 | C.I. PY 74 |
|  | 20 | 25 | 15 | 10 & 5 | 5 | 10 | 15 |
| Glycerin | 8 | 5 | 8 | 10 | 15 | 12 | 10 |
| Triethylene glycol | 5 | 3 | 4 | 5 | 5 | 5 | 5 |
| 1,2-hexanediol | 2 | 2 | 2 | 2 | 2 | 2 | 2 |
| Trimethylol propane | 2 | 2 | 2 | 2 | 4 | 3 | 2 |
| Triethylene glycol monobutyl ether | 2 | 2 | 2 | 2 | 2 | 2 | 2 |
| Olfine E1010 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 |
| Triethanol amine | 1 | 1 | 1 | 1 | 1 | 1 | 1 |
| Ion-exchanged water | Remainder | Remainder | Remainder | Remainder | Remainder | Remainder | Remainder |

TABLE 3

|  | Yellow ink compositions | | | | | | |
| --- | --- | --- | --- | --- | --- | --- | --- |
|  | Y4-4 | Y4-5 | Y5-1 | Y5-2 | Y5-3 | Y5-4 | Y5-5 |
| Pigment dispersion | Self-dispersion | Self-dispersion | Self-dispersion | Self-dispersion | Self-dispersion | Self-dispersion | Self-dispersion |
| Pigments | C.I. PY 74 | C.I. PY 74 | C.I. PY 128 | C.I. PY 128 | C.I. PY 128 | C.I. PY 128 | C.I. PY 128 |
|  | 20 | 25 | 5 | 10 | 15 | 20 | 25 |

TABLE 3-continued

| | Yellow ink compositions | | | | | | |
|---|---|---|---|---|---|---|---|
| | Y4-4 | Y4-5 | Y5-1 | Y5-2 | Y5-3 | Y5-4 | Y5-5 |
| Glycerin | 8 | 5 | 15 | 12 | 10 | 8 | 5 |
| Triethylene glycol | 5 | 3 | 5 | 5 | 5 | 5 | 3 |
| 1,2-hexanediol | 2 | 2 | 2 | 2 | 2 | 2 | 2 |
| Trimethylol propane | 2 | 2 | 4 | 3 | 2 | 2 | 2 |
| Triethylene glycol monobutyl ether | 2 | 2 | 2 | 2 | 2 | 2 | 2 |
| Olfine E1010 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 |
| Triethanol amine | 1 | 1 | 1 | 1 | 1 | 1 | 1 |
| Ion-exchanged water | Remainder | Remainder | Remainder | Remainder | Remainder | Remainder | Remainder |

TABLE 4

| | Yellow ink compositions | | | | | | |
|---|---|---|---|---|---|---|---|
| | Y6 | Y7 | Y8-1 | Y8-2 | Y8-3 | Y8-4 | Y8-5 |
| Pigment dispersion | Self-dispersion | Self-dispersion | Self-dispersion | Self-dispersion | Self-dispersion | Self-dispersion | Self-dispersion |
| Pigments | C.I. PY 110 | C.I. PY 109 | C.I. PY 154 | C.I. PY 154 | C.I. PY 154 | C.I. PY 154 | C.I. PY 154 |
| | 15 | 15 | 5 | 10 | 15 | 20 | 25 |
| Glycerin | 10 | 10 | 15 | 12 | 10 | 8 | 5 |
| Triethylene glycol | 5 | 3 | 5 | 5 | 5 | 5 | 3 |
| 1,2-hexanediol | 2 | 2 | 2 | 2 | 2 | 2 | 2 |
| Trimethylol propane | 2 | 2 | 4 | 3 | 2 | 2 | 2 |
| Triethylene glycol monobutyl ether | 2 | 2 | 2 | 2 | 2 | 2 | 2 |
| Olfine E1010 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 |
| Triethanol amine | 1 | 1 | 1 | 1 | 1 | 1 | 1 |
| Ion-exchanged water | Remainder | Remainder | Remainder | Remainder | Remainder | Remainder | Remainder |

TABLE 5

| | Yellow ink compositions | | | | | |
|---|---|---|---|---|---|---|
| | Y9 | Y10-1 | Y10-2 | Y10-3 | Y10-4 | Y10-5 |
| Pigment dispersion | Self-dispersion | Self-dispersion | Self-dispersion | Self-dispersion | Self-dispersion | Self-dispersion |
| Pigments | C.I. PY 138 | C.I. PY 150 | C.I. PY 150 | C.I. PY 150 | C.I. PY 150 | C.I. PY 150 |
| | 15 | 5 | 10 | 15 | 20 | 25 |
| Glycerin | 10 | 15 | 12 | 10 | 8 | 5 |
| Triethylene glycol | 5 | 5 | 5 | 5 | 5 | 3 |
| 1,2-hexanediol | 2 | 2 | 2 | 2 | 2 | 2 |

TABLE 5-continued

| | Yellow ink compositions | | | | | |
|---|---|---|---|---|---|---|
| | Y9 | Y10-1 | Y10-2 | Y10-3 | Y10-4 | Y10-5 |
| Trimethylol propane | 2 | 4 | 3 | 2 | 2 | 2 |
| Triethylene glycol monobutyl ether | 2 | 2 | 2 | 2 | 2 | 2 |
| Olfine E1010 | 0.5 | 0.5 | 0.5 | 0.5 | 0.5 | 0.5 |
| Surfynol 104 | 0.5 | 0.5 | 0.5 | 0.5 | 0.5 | 0.5 |
| Triethanol amine | 1 | 1 | 1 | 1 | 1 | 1 |
| Ion-exchanged water | Remainder | Remainder | Remainder | Remainder | Remainder | Remainder |

Evaluation Methods

Evaluation 1: OD Value

Each yellow ink composition prepared as described above was used to print a solid image on a recording medium using an ink jet printer, PX-G 900, manufactured by Seiko Epson Corporation, the printer being adapted to perform one-path printing at 360 dpi×360 dpi, whereby a sample was obtained. The recording medium was Xerox 4200. The sample was left for one hour in a common environment. The solid image of the resulting sample was measured for OD value with a Gretag densitometer available from GretagMacbeth. The sample was evaluated on the basis of standards below. The evaluation results are as shown in Table 6.

AA: an OD value of 1.3 or more
A: an OD value of 1.2 or more to less than 1.3
B: an OD value of 1.1 or more to less than 1.2
C: an OD value of 1.0 or more to less than 1.1
D: an OD value of less than 1.0

Evaluation 2: Light Resistance

Each yellow ink composition prepared as described above was used for printing in substantially the same manner as that described in Evaluation 1 except that duty was adjusted such that an obtained print had an OD value of 1.0. The print was placed into a chamber placed in a light resistance tester (fluorescent light resistance tester) available from Suga Test Instruments Co., Ltd. and then left for 40 days in a 24° C. environment with a humidity of 60%. The resulting print was measured for color. The residual rate of the OD value of the fresh print was calculated. The print was evaluated on the basis of standards below. The light resistance tester included 60 fluorescent lights and was capable of subjecting each print to an exposure test in which the illuminance of a printed surface of the print was adjusted to 70,000 lux. The evaluation results are as shown in Table 6.

A: 85% or more
B: 70% or more to less than 85%
C: less than 70%

Evaluation 3: Storage Stability

Each yellow ink composition prepared as described above was measured for viscosity with a vibratory viscometer available from Yamaichi Electronics Co., Ltd. Into a 100 g plastic bottle, 60 g of the yellow ink composition was placed. After the plastic bottle was sealed, the yellow ink composition was left at 70° C. for one week. The resulting yellow ink composition was measured for viscosity with the vibratory viscometer. The yellow ink composition was evaluated for storage stability from the rate of change in viscosity thereof on the basis of standards below. The evaluation results are as shown in Table 6.

A: a rate of change in viscosity of greater than −5% to less than 5%
B: a rate of change in viscosity of greater than −10% to −5% or less or a rate of change in viscosity of 5% or more to less than 10%
C: a rate of change in viscosity of −10% or less or 10% or more

TABLE 6

| | Yellow ink compositions | OD value | Light resistance | Storage stability |
|---|---|---|---|---|
| Example 1 | Y1-3 | A | A | A |
| Example 2 | Y2 | A | A | A |
| Example 3 | Y1-2 | B | A | A |
| Example 4 | Y1-4 | AA | A | B |
| Example 5 | Y3 | AA | B | A |
| Comparative Example 1 | Y4-3 | AA | C | B |
| Comparative Example 2 | Y5-3 | D | A | A |
| Comparative Example 3 | Y6 | C | B | A |
| Comparative Example 4 | Y7 | C | B | A |
| Comparative Example 5 | Y8-3 | D | A | A |
| Comparative Example 6 | Y9 | C | C | A |
| Comparative Example 7 | Y10-3 | D | A | A |
| Comparative Example 8 | Y1-1 | D | A | A |
| Comparative Example 9 | Y1-5 | AA | A | C |

Evaluation 4: Lightness (L*) and Chroma (C*) (fixed pigment concentration)

Yellow Ink Compositions Y1-3, Y4-3, Y5-3, Y8-3, and Y10-3 having a pigment concentration of 15% were used to print gradation patches with a duty of 25%, 40%, 50%, 80%, or 100% in the same manner as that described in Evaluation 1.

Each output pattern was analyzed with a spectrophotometer, GretagMacbeth SPM 50, available from GretagMacbeth, whereby coordinates in the Lab color system, specified by CIE, for color-difference specification were determined. Analysis conditions were as follows: a D50 light source was used, no light source filter was used, the angle of view was two degrees, and a white reference used was absolute white.

The chroma C* of each patch was determined from obtained measurements using the following equation:

$$C^* = ((a^*)^2 + (b^*)^2)^{1/2}.$$

Obtained results are as shown in FIG. 1.

Evaluation 5: lightness (L*) and chroma (C*) (fixed duty)

ducibility from the obtained Gumat volume on the basis of standards below. The evaluation results are as shown in Table 7.

A: 240,000 or more
B: 200,000 or more to less than 240,000
C: 140,000 or more to less than 200,000
D: less than 140,000

TABLE 7

| Ink sets | | Cyan ink compositions | Magenta ink compositions | Yellow ink compositions | Color reproducibility |
|---|---|---|---|---|---|
| Example 6 | Ink Set 1 | C1-2 | M1-2 | Y1-3 | A |
| Example 7 | Ink Set 2 | C1-2 | M1-2 | Y2 | A |
| Example 8 | Ink Set 3 | C1-2 | M1-2 | Y1-2 | B |
| Example 9 | Ink Set 4 | C1-2 | M1-2 | Y1-4 | A |
| Example 10 | Ink Set 5 | C1-2 | M1-2 | Y3 | A |
| Comparative Example 10 | Ink Set 6 | C1-2 | M1-2 | Y4-3 | A |
| Comparative Example 11 | Ink Set 7 | C1-2 | M1-2 | Y5-3 | C |
| Comparative Example 12 | Ink Set 8 | C1-2 | M1-2 | Y6 | C |
| Comparative Example 13 | Ink Set 9 | C1-2 | M1-2 | Y7 | C |
| Comparative Example 14 | Ink Set 10 | C1-2 | M1-2 | Y8-3 | D |
| Comparative Example 15 | Ink Set 11 | C1-2 | M1-2 | Y9 | C |
| Comparative Example 16 | Ink Set 12 | C1-2 | M1-2 | Y10-3 | D |
| Comparative Example 17 | Ink Set 13 | C1-1 | M1-1 | Y1-1 | D |
| Comparative Example 18 | Ink Set 14 | C1-2 | M1-2 | Y1-5 | A |

Yellow Ink Compositions Y1-1 to Y1-5, Y4-1 to Y4-5, Y5-1 to Y5-5, Y8-1 to Y8-5, and Y10-1 to Y10-5 were used to print gradation patches with a duty of 100% in the same manner as that described in Evaluation 1.

Each output pattern was analyzed with a spectrophotometer, GretagMacbeth SPM 50, available from GretagMacbeth, whereby coordinates in the Lab color system, specified by CIE, for color-difference specification were determined. Analysis conditions were as follows: a D50 light source was used, no light source filter was used, the angle of view was two degrees, and a white reference used was absolute white.

The chroma C* of each patch was determined from obtained measurements using the following equation:

$$C^* = ((a^*)^2 + (b^*)^2)^{1/2}.$$

Figure 2:
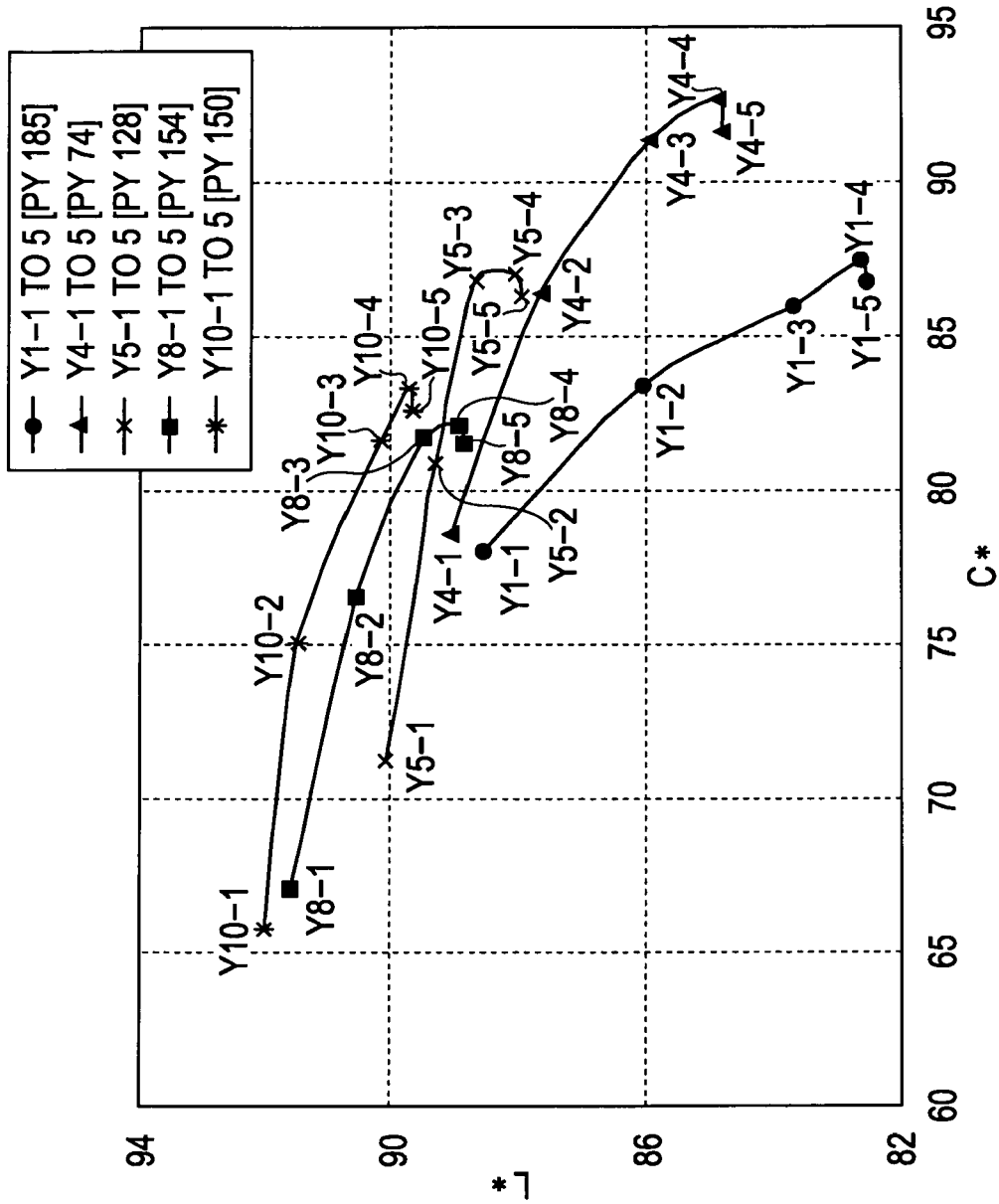
FIG. 2 is a graph showing the relationship between the lightness (L*) and chroma (C*) determined by fixing duty.
Figure 3:
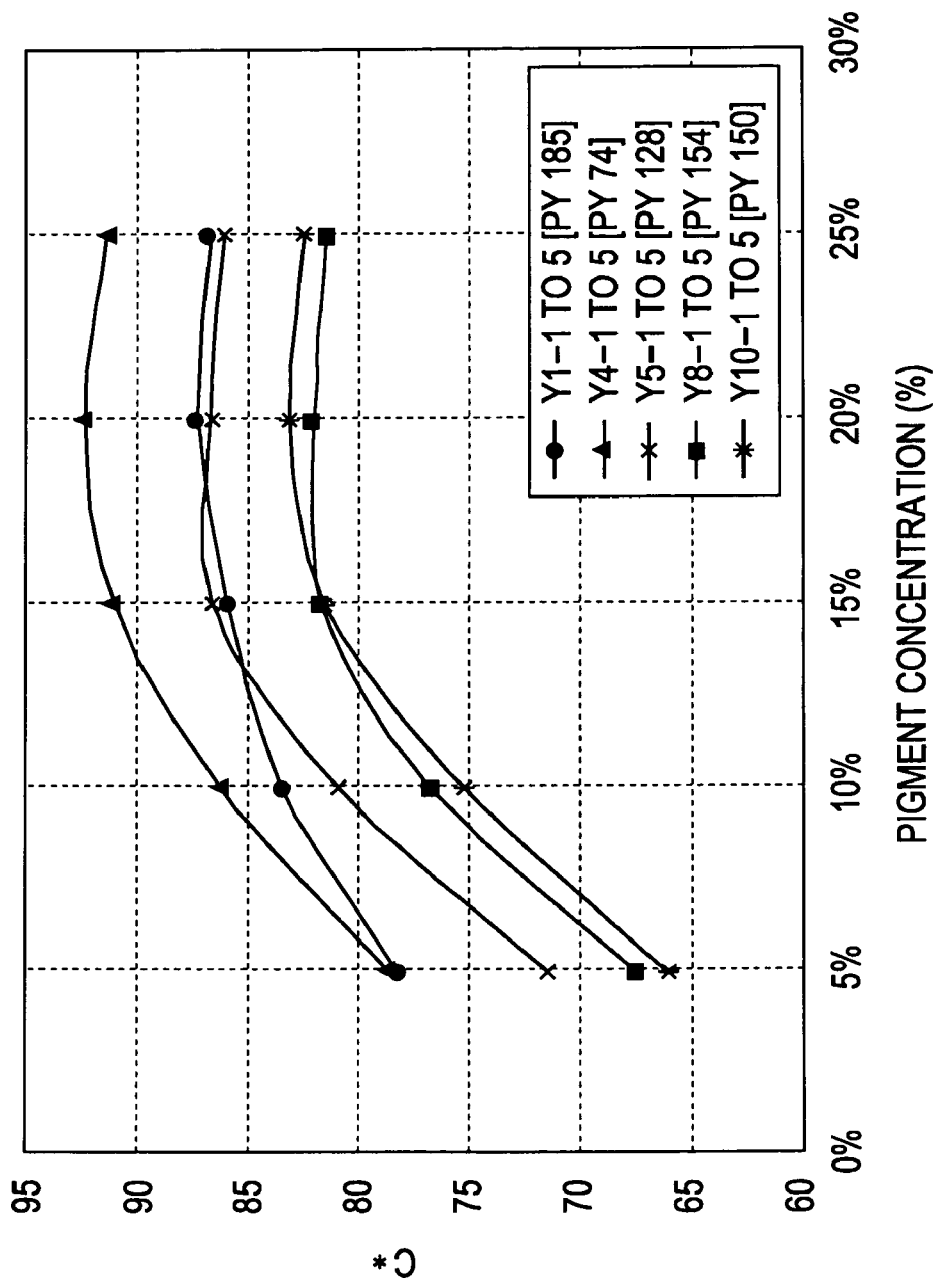
FIG. 3 is a graph showing the relationship between the pigment concentration of each ink and chroma (C*).

Obtained results are as shown in FIGS. 2 and 3.

Evaluation 6: Pigment Concentration and OD Value

Figure 4:
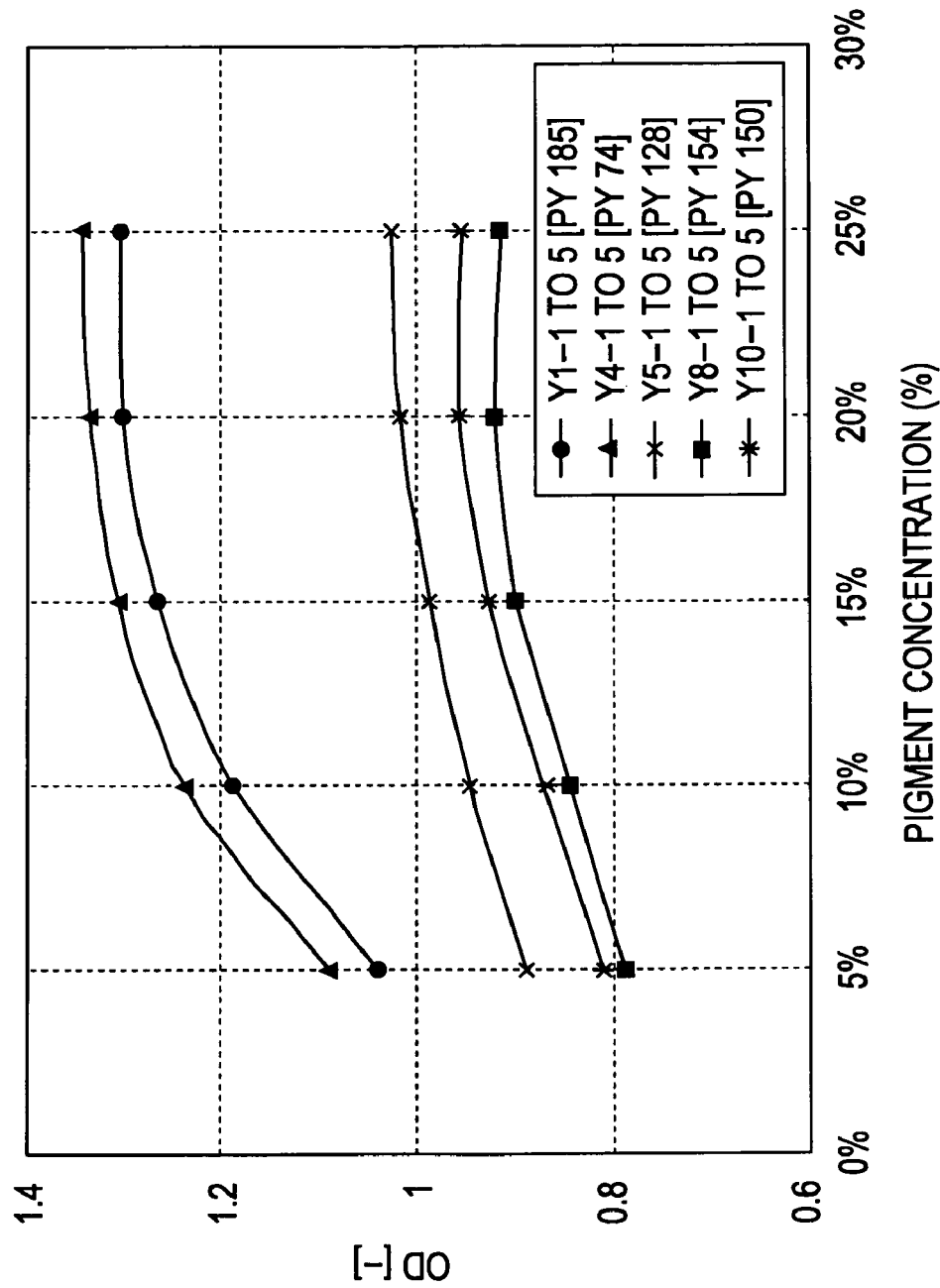
FIG. 4 is a graph showing the relationship between the pigment concentration of each ink and OD value.

Yellow Ink Compositions Y1-1 to Y1-5, Y4-1 to Y4-5, Y5-1 to Y5-5, Y8-1 to Y8-5, and Y10-5 to Y10-5 were used to print solid images in the same manner as that described in Evaluation 1. The solid images were measured for OD value. Obtained results are as shown in FIG. 4.

Evaluation 7: Color Reproducibility

The ink compositions obtained as described above were combined with each other as shown in Table 7, whereby ink sets were prepared. Each ink set was used to print an output pattern including 400 patches in the same manner as that described in Evaluation 1. Each print was measured for color and the volume in the Lab three-dimensional space was calculated with a calculation tool. The obtained Gumat volume was dimensionless. The print was evaluated for color repro-

What is claimed is:

1. A yellow ink composition comprising C. I. Pigment Yellow 185 used as a colorant, having a pigment concentration of 10 to 20 weight percent.

2. The yellow ink composition according to claim 1, further comprising water, a water-soluble organic compound, a pH adjuster, and a nonionic surfactant.

3. The yellow ink composition according to claim 2, wherein the water-soluble organic compound comprises a polyol, a solid humectant, and a glycol butyl ether.

4. The yellow ink composition according to claim 2, wherein the pH adjuster is an alkali hydroxide and/or a trialkanolamine.

5. The yellow ink composition according to claim 2, wherein the nonionic surfactant is an acetylene glycol surfactant and/or a polyether-modified siloxane surfactant.

6. An ink set for ink jet recording, comprising:
a cyan ink composition;
a magenta ink composition; and
a yellow ink composition,
wherein the cyan ink composition comprises at least one of C. I. Pigment Blue 15:3 and C. I. Pigment Blue 15:4 used as colorants; the magenta ink composition comprises at least one selected from the group consisting of C. I. Pigment Red 122, C. I. Pigment Red 202, C. I. Pigment Red 209, and C. I. Pigment Violet 19 used as colorants; the yellow ink composition comprises C. I. Pigment Yellow 185 used as a colorant; and the cyan, magenta, and yellow ink compositions have a pigment concentration of 10 to 20 weight percent.

7. The ink set according to claim 6, wherein the cyan, magenta, and yellow ink compositions each comprise water, a water-soluble organic compound, a pH adjuster, and a nonionic surfactant.

8. The ink set according to claim 7, wherein the water-soluble organic compound comprises a polyol, a solid humectant, and a glycol butyl ether.

9. The ink set according to claim 7, wherein the pH adjuster is an alkali hydroxide and/or a trialkanolamine.

10. The ink set according to claim 7, wherein the nonionic surfactant is an acetylene glycol surfactant and/or a polyether-modified siloxane surfactant.

11. An ink jet recording method comprising:

ejecting droplets of at least one of the cyan, magenta, and yellow ink compositions comprised in the ink composition according to any one of claims 6 to 10; and applying the droplets to a recording medium to print a character on the recording medium.

12. A record made by the ink jet recording method according to claim 11.

* * * * *